US009115599B2

(12) United States Patent
Schumnig et al.

(10) Patent No.: US 9,115,599 B2
(45) Date of Patent: Aug. 25, 2015

(54) EXHAUST-GAS TURBOCHARGER

(75) Inventors: Oliver Schumnig, Gundersheim (DE); Frank Scherrer, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 440 days.

(21) Appl. No.: 12/959,479

(22) Filed: Dec. 3, 2010

(65) Prior Publication Data

US 2011/0142604 A1 Jun. 16, 2011

(30) Foreign Application Priority Data

Dec. 16, 2009 (DE) .......................... 10 2009 058 411

(51) Int. Cl.
*F01D 25/24* (2006.01)
*F02C 6/12* (2006.01)

(52) U.S. Cl.
CPC . *F01D 25/24* (2013.01); *F02C 6/12* (2013.01); *F05D 2220/40* (2013.01); *F05D 2260/30* (2013.01); *F05D 2260/33* (2013.01)

(58) Field of Classification Search
CPC ..... F01D 25/243; F01D 25/24; F01D 25/265; F01D 25/26; F04D 29/42; F04D 29/403; F04D 29/40; F04D 29/62; F04D 29/60

USPC ........................................................ 415/215.1
See application file for complete search history.

(56) References Cited

U.S. PATENT DOCUMENTS

| 8,210,808 B2 * | 7/2012 | Clarence et al. ........... 415/214.1 |
| 8,257,027 B2 * | 9/2012 | Hoecker et al. ............... 415/126 |
| 2004/0109761 A1 * | 6/2004 | Scherrer ....................... 415/206 |
| 2007/0216161 A1 * | 9/2007 | Regener et al. ............... 285/377 |
| 2009/0183510 A1 * | 7/2009 | Bielass .......................... 60/611 |

* cited by examiner

*Primary Examiner* — Nathaniel Wiehe
*Assistant Examiner* — Jeffrey A Brownson
(74) *Attorney, Agent, or Firm* — A. Michael Tucker; Stephan A. Pendorf; Patent Central LLC

(57) ABSTRACT

The invention relates to an exhaust-gas turbocharger (1) having a compressor housing (3), having a bearing housing (28) which can be connected at one end to the compressor housing (3) by means of a first fastening device (19), and having a turbine housing (2) which can be connected to the bearing housing (28) at the other end of the latter by means of a second fastening device (20), with the compressor housing (3), the bearing housing (28) and the turbine housing (2) extending along an exhaust-gas turbocharger longitudinal axis (R), wherein the second fastening device (20) is designed as a plug-and-twist connecting device, and a seal (25) is provided between the turbine housing (2) and the bearing housing (28).

11 Claims, 3 Drawing Sheets

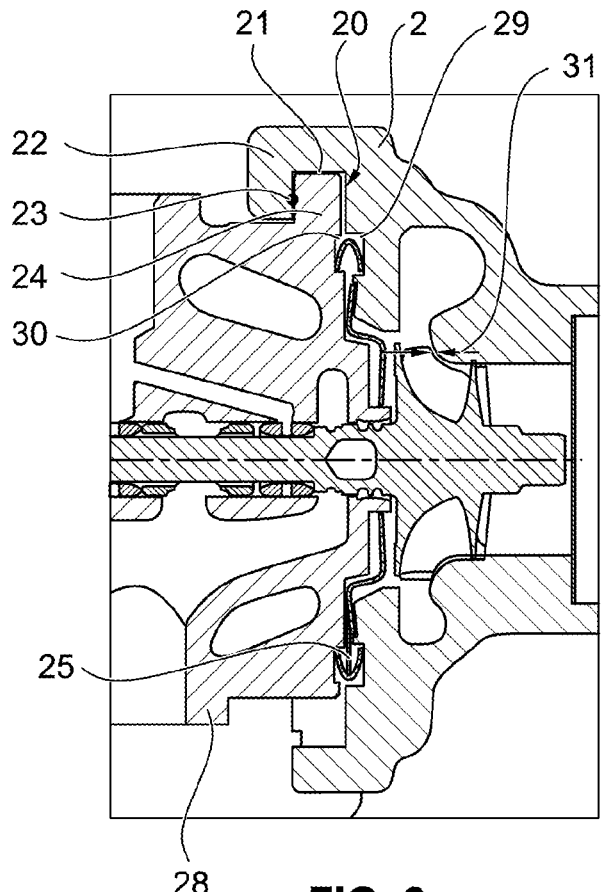
FIG. 2
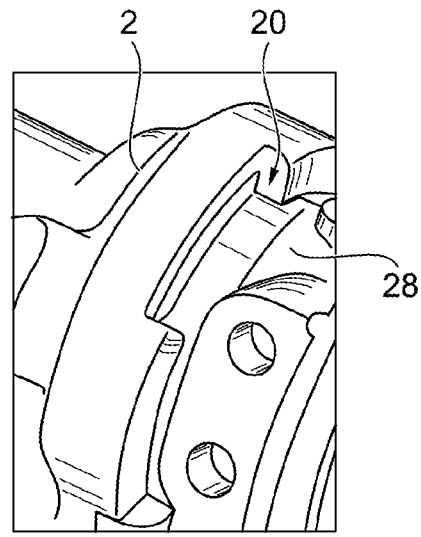
FIG. 3
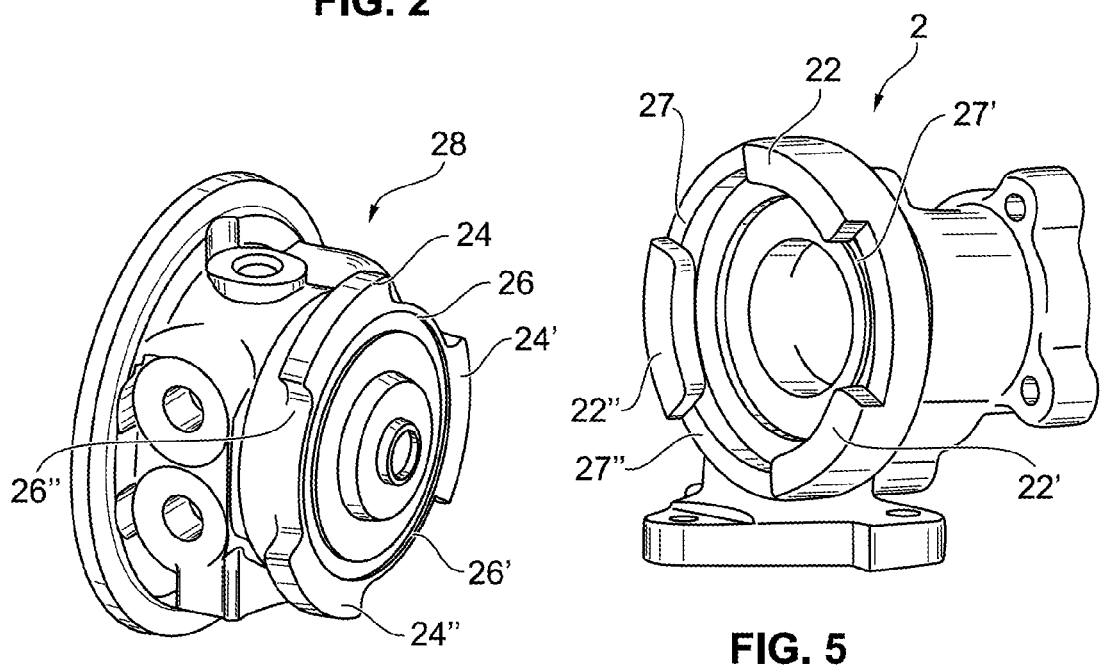
FIG. 4
FIG. 5

EXHAUST-GAS TURBOCHARGER

The invention relates to an exhaust-gas turbocharger according to the preamble of claim 1.

An exhaust-gas turbocharger of said type is known for example from EP 1 734 231 A1. In a generic turbocharger, the mounting of the turbine housing on the bearing housing takes place by means of a fastening device in the form of a screw connection, which constitutes a time-consuming working step. This is firstly because a multiplicity of internal threads must be provided, and the screwing process takes place using suitable tools. Furthermore, at present, no seals are provided between the turbine housing and the bearing housing, which would however be imperatively necessary for example for adhering to the Euro 6 exhaust gas standards. Thin-layer seals, which are known per se, with a thickness of approximately 0.2 mm would not be capable of withstanding exhaust-gas temperatures of more than 850° C., and would otherwise result in excessively low pressure forces for compensating thermal deformations. Axially compressed seals which are known per se would be unsuitable on account of the screw connections hitherto provided between the turbine housing and the bearing housing, because such seals would place an excessive load on the screw assembly. Such axially compressed seals are entirely unsuitable for clamping band applications.

It is therefore an object of the present invention to provide an exhaust-gas turbocharger of the type specified in the preamble of claim 1 which permits a simplification of the mounting of the turbine housing on the bearing housing, a considerable acceleration of said mounting process, and sealing between the turbine housing and the bearing housing.

Said object is achieved by means of the features of claim 1.

Since the second fastening device is designed as a plug-and-twist connecting device which, for mounting, requires merely a plugging movement and a subsequent twisting movement in order to lock the two components, the desired acceleration and simplification of the mounting process are obtained, wherein, furthermore, no tools are required. Furthermore, such a fastening device permits fully automated mounting of the turbine housing on the bearing housing. Furthermore, the provision of a plug-and-twist connecting device as a fastening between the turbine housing and bearing housing makes it possible to provide thick seals with wall thicknesses of greater than 0.6 mm, which seals spread the turbine housing and the bearing housing apart from one another and fix the assembly by means of the clamping lugs on the bearing housing and turbine housing. On account of the possible large wall thickness and the associated spring force of the seal, a high contact pressure acts at the sealing edge, which contact pressure is capable of better compensating thermal deformations and ensuring a stable and durable sealing action between the turbine housing and the bearing housing.

This results in the further advantage that it is possible to produce a sealing action between the turbine housing and the bearing housing which is suitable for the Euro 6 exhaust gas standard.

Furthermore, cost savings are obtained because the clamping lugs on the turbine housing and on the bearing housing can be realized with less machining expenditure than that required for the hitherto conventional screw connections.

Furthermore, no complex production tolerances need be adhered to, and a low component loading is obtained as a result of a uniform radial introduction of force at the connecting point between the turbine housing and the bearing housing. Finally, the advantage of a small packaging requirement is obtained.

The subclaims relate to advantageous refinements of the invention.

The plug-and-twist connecting device according to the invention may be of similar construction to a bayonet connection, and provided with corresponding clamping lugs which can be attached to the turbine housing or bearing housing.

Here, it is possible for the clamping lugs to be machined out of the blanks of the bearing housing and of the turbine housing by means of a milling and turning operation.

Secondly, fastener rings provided with clamping lugs may be formed as separate parts which, after the production thereof, may be attached to the bearing housing and to the turbine housing for example by means of a press fit or by shrink-fitting.

In the case of the turbine housing, it is preferably also possible for the fastener ring or the clamping lugs to be cast directly into the turbine housing.

Also preferably possible are simple anti-twist facilities for example in the form of a bayonet connection, a wedge engagement or a single screw in the connecting region between the turbine housing and bearing housing.

Also preferable is the integration of an insulation layer between the contact surfaces of the clamping lugs of the turbine housing and of the bearing housing for thermal decoupling. Such an insulation layer may be produced for example from ceramic material.

The number of clamping lugs may be adapted to the respective application, wherein three or four clamping lugs constitute particularly preferred embodiments.

It is likewise possible for the connecting device according to the present invention to be realized on the compressor side.

The seal which is provided, preferably in the form of a C-shaped seal or V-shaped seal, may be adapted with regard to its wall thickness and material according to the application.

It is also possible, in contrast to previously known turbochargers, to use a cheaper casting material (GG 25) for the bearing housing, which material is suitable even for high-temperature applications on account of the thermal decouplings which are preferably possible.

Further details, advantages and features of the present invention will emerge from the following description of exemplary embodiments on the basis of the drawing, in which:

FIG. 2 shows a partial view of the turbine housing of the exhaust-gas turbocharger according to FIG. 1 which, for the explanation of the principles of the invention, is illustrated in the state in which it is mounted on the bearing housing;

FIG. 3 shows a perspective partial view of the bearing housing mounted on the turbine housing;

FIGS. 4 and 5 show two illustrations of the bearing housing and turbine housing in the non-mounted state.

Figure 1:
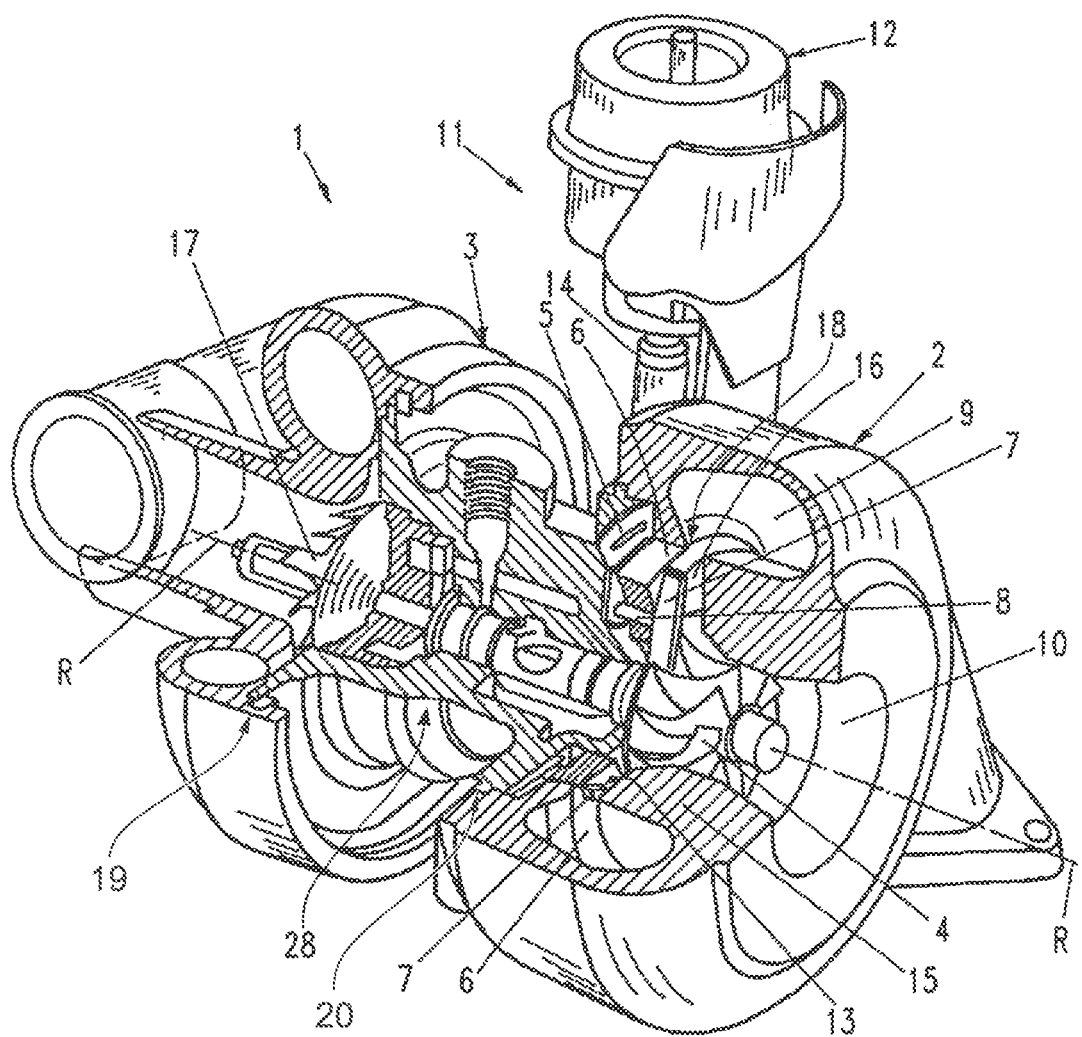
FIG. 1 shows a perspective, partially cut-away illustration of an exhaust-gas turbocharger according to the invention.

FIG. 1 shows one possible embodiment of an exhaust-gas turbocharger 1 according to the invention in a cut-away perspective illustration, which exhaust-gas turbocharger has a turbine housing 2 and a compressor housing 3 which are mounted on the in each case adjacent ends of a bearing housing 28. Here, a first fastening device 19 for fixing the bearing housing 28 to the compressor housing 3 and a second fastening device 20 for fixing the bearing housing 28 to the turbine housing 2 are illustrated in each case in schematically simplified form. The design of the second fastening device 20 will be explained in detail on the basis of the following FIGS. 2 to 5.

All the other components identified by the reference symbols plotted in FIG. 1 are listed in the appended list of reference symbols, but are of secondary significance for the explanation of the principles of the present invention, and are accordingly optional components of the exhaust-gas turbocharger 1 which need not all imperatively be provided but which may be provided, as can be seen from FIG. 1.

FIGS. 2 and 3 show the turbine housing 2 which can be fixed to the bearing housing 28 via the abovementioned second fastening device 20.

FIGS. 4 and 5 show the bearing housing 28 and the turbine housing 2 in the non-mounted state, in order to be able to even more clearly illustrate the components of the connecting device 20.

As can be seen from a juxtaposition of FIGS. 2 to 5, the fastening device 20 in the example has in each case three clamping lugs 22, 22', 22" on the turbine housing 2 and complementarily designed clamping lugs 24, 24', 24" on the bearing housing 28. As shown in particular by FIGS. 4 and 5, said clamping lugs are arranged in each case spaced apart from one another and therefore delimit passage openings 27, 27', 27" in the case of the turbine housing 2, and passage openings 26, 26', 26" in the case of the bearing housing 28. Said arrangement makes possible the design of a plug-and-twist connection, because the respective clamping lugs are plugged through the associated passage openings, and after being plugged through axially in this way, a rotational movement takes place for the purpose of fixing, as a result of which rotational movement the clamping lugs 22, 22', 22" and 24, 24', 24" engage behind one another. The fastening device 20 is therefore referred to as a plug-and-twist connecting device. As can be seen in particular from FIG. 2, in the mounted state, radial centering is provided at the point denoted by the reference numeral 21.

A heat insulation layer 23 may be provided between the clamping lugs, which heat insulation layer is symbolized by the point denoted by the above-mentioned reference symbol 23.

Figure 6:
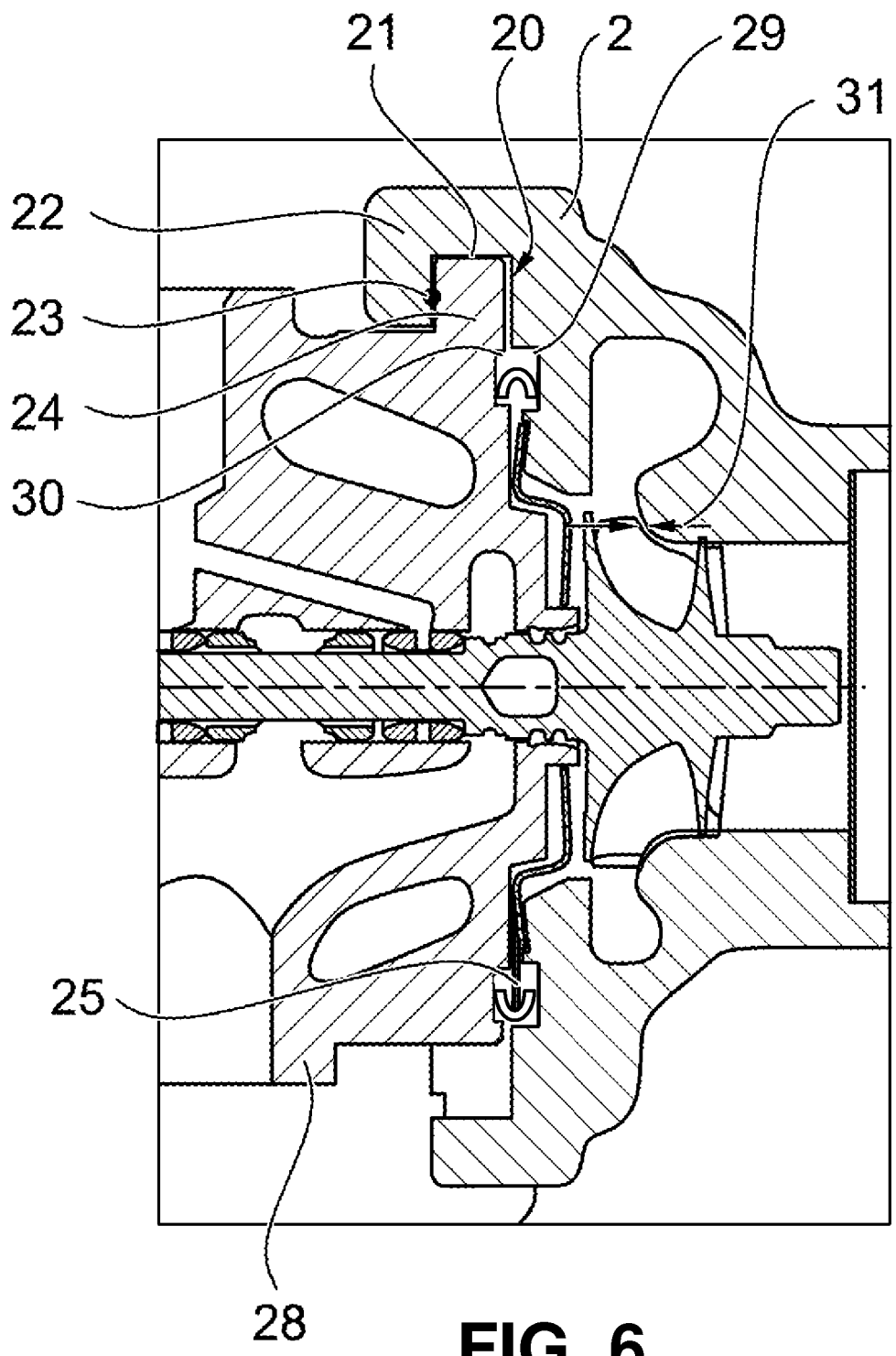
FIG. 6 shows a partial view of the turbine housing of the exhaust-gas turbocharger according to FIG. 1, showing a C-ring seal.

FIG. 2 also shows that a seal is arranged between the turbine housing 2 and the bearing housing 28, which seal is designed, in the embodiment illustrated in FIG. 2, as a V-shaped seal or sealing spring. FIG. 6 shows an embodiment in which the seal is designed as a C-shaped seal or sealing spring. In the mounted state, which is shown in FIG. 2, said seal 25 is situated in associated holding grooves 29 and 30 of the turbine housing 2 and of the bearing housing 28. Here, the deformation of the seal 25 has no influence on the axial contour gap between the turbine housing 2 and turbine rotor 4. There is no encircling contact surface between the bearing housing 28 and turbine housing 2 either radially or axially. In addition to the above written disclosure, reference is hereby explicitly made to the diagrammatic illustration thereof in FIGS. 1 to 6.

LIST OF REFERENCE SYMBOLS

1 Turbocharger
2 Turbine housing
3 Compressor housing
4 Turbine rotor
5 Adjusting ring or holding ring
6 Blade bearing ring
7 Guide blades
8 Pivot axes
9 Supply duct
10 Axial connecting piece
11 Actuating device
12 Control housing
13 Clearance for guide blades 7
14 Plunger element
15 Annular part of the turbine housing 2
16 Spacer/spacer cam
17 Compressor rotor
18 Guide grate
19 First fastening device
20 Second fastening device
21 Radial centering means (radial contact surface)
22, 22', 22" First clamping lugs
23 Insulation layer (axial contact surface)
24, 24', 24" Second clamping lugs
25 Seal
26, 26', 26" Passage openings
27, 27', 27" Passage openings
28 Bearing housing
29, 30 Holding grooves
31 Axial contour gap
R Rotational axis/exhaust-gas turbocharger longitudinal axis

The invention claimed is:

1. An exhaust-gas turbocharger (1) comprising:
a compressor housing (3),
a bearing housing (28) connected at one end to the compressor housing (3) by means of a first fastening device (19), and
a turbine housing (2) connected to the bearing housing (28) at the other end of the latter by means of a second fastening device (20),
wherein the compressor housing (3), the bearing housing (28) and the turbine housing (2) extend along an exhaust-gas turbocharger longitudinal axis (R),
wherein the second fastening device (20) is a plug-and-twist connecting device comprising clamping lugs on the bearing housing and turbine housing,
wherein a seal (25) is provided between the turbine housing (2) and the bearing housing (28), the seal (25) having a wall thickness of at least 0.6 mm, and
wherein the seal (25) spreads the turbine housing and bearing housing apart from one another and fixes the turbine housing to the compressor housing by means of the clamping lugs on the bearing housing and turbine housing.

2. The exhaust-gas turbocharger as claimed in claim 1, wherein the second fastening device (20) has first clamping lugs (22) which are arranged on the turbine housing (2), point towards the exhaust-gas turbocharger longitudinal axis (R) and are provided spaced apart from one another, and has second clamping lugs (24) which are arranged on the bearing housing (28), are complementary to the first clamping lugs (22) and are spaced apart from one another and point away from the exhaust-gas turbocharger longitudinal axis (R).

3. The exhaust-gas turbocharger as claimed in claim 2, wherein the first clamping lugs (22, 22', 22") are formed in one piece with the turbine housing (2).

4. The exhaust-gas turbocharger as claimed in claim 2, wherein the second clamping lugs (24, 24', 24") are formed in one piece with the bearing housing (28).

5. The exhaust-gas turbocharger as claimed in claim 2, wherein a heat insulation layer (23) is provided between the first and second clamping lugs (22, 22', 22" and 24, 24', 24").

6. The exhaust-gas turbocharger as claimed in claim 1, wherein the second fastening device (20) is provided with an anti-twist facility for preventing the release of the connection between the bearing housing (28) and the turbine housing (2).

7. The exhaust-gas turbocharger as claimed in claim 1, wherein the second connecting device (20) is a bayonet connection.

8. The exhaust-gas turbocharger as claimed in claim 1, wherein the seal (25) is designed as a C-ring seal.

9. The exhaust-gas turbocharger as claimed in claim 1, wherein the seal (25) is designed as a V-ring seal.

10. The exhaust-gas turbocharger as claimed in claim 1, wherein the seal (25) does not influence the axial contour gap (31) between the turbine housing (2) and the turbine rotor (4).

11. An exhaust-gas turbocharger (1) comprising:
a compressor housing (3);
a bearing housing (28) connected at one end to the compressor housing (3) by means of a first fastening device (19);
a turbine housing (2) connected to the bearing housing (28) at the other end of the latter by means of a second fastening device (20),
wherein the compressor housing (3), the bearing housing (28) and the turbine housing (2) extend along an exhaust-gas turbocharger longitudinal axis (R),
wherein the second fastening device (20) is a plug-and-twist connecting device comprising clamping lugs on the bearing housing and turbine housing,
wherein a seal (25) is provided between the turbine housing (2) and the bearing housing (28), the seal (25) having a wall thickness of at least 0.6 mm, wherein the seal (25) spreads the turbine housing and bearing housing apart from one another and fixes the turbine housing to the compressor housing by means of the clamping lugs on the bearing housing and turbine housing, and
wherein no encircling contact surface is provided between the turbine housing (2) and the bearing housing (28) either in the axial direction or in the radial direction, except for at most at the connection between the turbine housing (2) and the bearing housing (28) by means of the second fastening device (20).

\* \* \* \* \*